US006644909B2

United States Patent
Patrito

(10) Patent No.: US 6,644,909 B2
(45) Date of Patent: Nov. 11, 2003

(54) OVERHEAD RUNWAY TRANSPORTATION HANGER WITH LOAD RAISING AND LOWERING SYSTEM

(75) Inventor: Donato Patrito, Leini (IT)

(73) Assignee: Fata Handling S.p.A., S. Marco Evangelista (IT)

( * ) Notice: Subject to any disclaimer, the term of this patent is extended or adjusted under 35 U.S.C. 154(b) by 0 days.

(21) Appl. No.: 09/865,422

(22) Filed: May 29, 2001

(65) Prior Publication Data

US 2001/0045341 A1 Nov. 29, 2001

(30) Foreign Application Priority Data

May 26, 2000 (IT) .................................. MI2000A001175

(51) Int. Cl.[7] .............................................. B66C 13/06
(52) U.S. Cl. ...................................... 414/626; 414/650
(58) Field of Search ............................... 414/626, 643, 414/650, 119, 113; 254/266, 286, 311; 187/255–8

(56) References Cited

U.S. PATENT DOCUMENTS

| | | | |
|---|---|---|---|
| 1,841,958 A | * 1/1932 | Kendall et al. | 187/264 |
| 4,002,321 A | * 1/1977 | Shaw et al. | 212/97 |
| 4,781,510 A | * 11/1988 | Smith et al. | 187/259 |
| 5,538,382 A | * 7/1996 | Hasegawa et al. | 212/319 |
| 5,593,247 A | * 1/1997 | Endres et al. | 114/44 |
| 5,853,531 A | * 12/1998 | Murphy et al. | 100/176 |
| 6,021,911 A | * 2/2000 | Glickman et al. | 212/274 |
| 6,273,401 B1 | * 8/2001 | Payne | 212/166 |

FOREIGN PATENT DOCUMENTS

| | | | | |
|---|---|---|---|---|
| EP | 0147530 A2 | 7/1985 | | |
| EP | 0350097 A1 | 1/1990 | | |
| EP | 0 905 082 A1 | * 3/1999 | | B66C/17/04 |
| EP | 1000699 A2 | 5/2000 | | |
| JP | 09-52604 | * 2/1997 | | B65G/1/04 |

OTHER PUBLICATIONS

Patent Abstracts of Japan, vol. 1996, No. 1, Jan. 31, 1996 and JP 07232270A (Nissan Motor Co. Ltd.), Sep. 5, 1995.

* cited by examiner

Primary Examiner—Eileen D. Lillis
Assistant Examiner—Charles A. Fox
(74) Attorney, Agent, or Firm—Jacobson Holman PLLC

(57) ABSTRACT

A hanger for transportation of objects along a suspended runway includes an upper part constrained to run along a runway and a lower part which supports the load and is connected to the upper part through a raising and lowering system. Between the two parts is a stiffening structure against oscillations which comprises three stiffening members one of which has a parallelogram and is arranged on the median plane of the hanger while the other two are made with oscillating rods each of which is placed on one side of the central one. The oscillating rods are advantageously made up of pairs of triangles connected by an articulation to the vertex and hinged at the base in a direction transverse to the hanger.

7 Claims, 3 Drawing Sheets

OVERHEAD RUNWAY TRANSPORTATION HANGER WITH LOAD RAISING AND LOWERING SYSTEM

BACKGROUND OF THE INVENTION

The present invention relates to a transportation hanger having vertical movement in overhead systems.

In certain technological processes typical of automobile manufacturing and provided with continuous overhead transportation systems it is necessary to change the height of the objects handled in relation to a predetermined working level for reasons of accessibility and to enable operators or automated working means to respect ergonomics or machine optimization.

For example, there may transit on the same transportation line a basic vehicle type or so-called derivative types which could require different and changeable working heights. In addition, different vehicles might transit simultaneously on the same line or the lines might have to be converted for processing of different models.

Lastly, for better ergonomics in the manual work stations the ability to change the height above the floor of vehicles being processed must be provided so as to adapt it to the operators' height.

In the prior art, transportation hangers equipped with a powered vertically movable frame for moving the object transported to a desired height above the floor upon command have been proposed.

A first problem in the design of hangers with onboard lifting is due to the fact that such a transportation system must naturally allow the longest desired travel without noticeably increasing the space occupied by the closed frame hanger in relation to the space occupied by a fixed frame hanger because the structure of the entire transportation system is conditioned by building height, clear spans, crossover constraints, and overpassing of fixed parts or other systems.

Other design problems arise from the fact that the hangers must have sufficient rigidity against thrusts against the frame and in particular when it is completely lowered and in case of failure it must ensure holding of the movable frame around or beneath which people work.

The prior art has proposed hangers equipped with a powered parallelogram board which however are suited to medium width runways. For higher runways hangers with frames having complicated and cumbersome parallelograms or cable systems accompanied by a stiffening system have been proposed.

For example, there have been proposed transportation hangers having cable lifting and equipped with stiffeners articulated on the X and Y axes. These stiffeners are normally three in number and articulated in such a manner as to accompany the movable frame in its travel.

Each stiffening is provided by two rigid members connected together by a hinge. Basically they belong to a single type; the rigid members are prismatic rods similar to boards hinged at the center of junction and at the two ends. These stiffening members are installed on the hanger in such a manner as to provide stiffening in the plane perpendicular to the plane of oscillation. Thus torque links one of which folds back transversally and two longitudinally to the hanger extension are obtained. The stiffness of the structure is however not always satisfactory. In addition, in these structures the arrangement of the hinges and in particular the use of three hinges for each torque link require a high degree of alignment accuracy.

The general purpose of the present invention is to remedy the above mentioned shortcomings by making available a structure easy to produce and having satisfactory stiffness and safety.

SUMMARY OF THE INVENTION

In view of this purpose it was sought to provide in accordance with the present invention a hanger for transportation of objects along a suspended runway comprising an upper part constrained to run along the runway and a lower part for load support connected to the upper part through a raising and lowering system with there being arranged between the two parts a stiffening structure against oscillations characterized in that the stiffening structure comprises three stiffening members one of which is a parallelogram and is arranged on the median plane of the hanger while the other two are made with oscillating rods and are positioned with one on each side of the central one.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
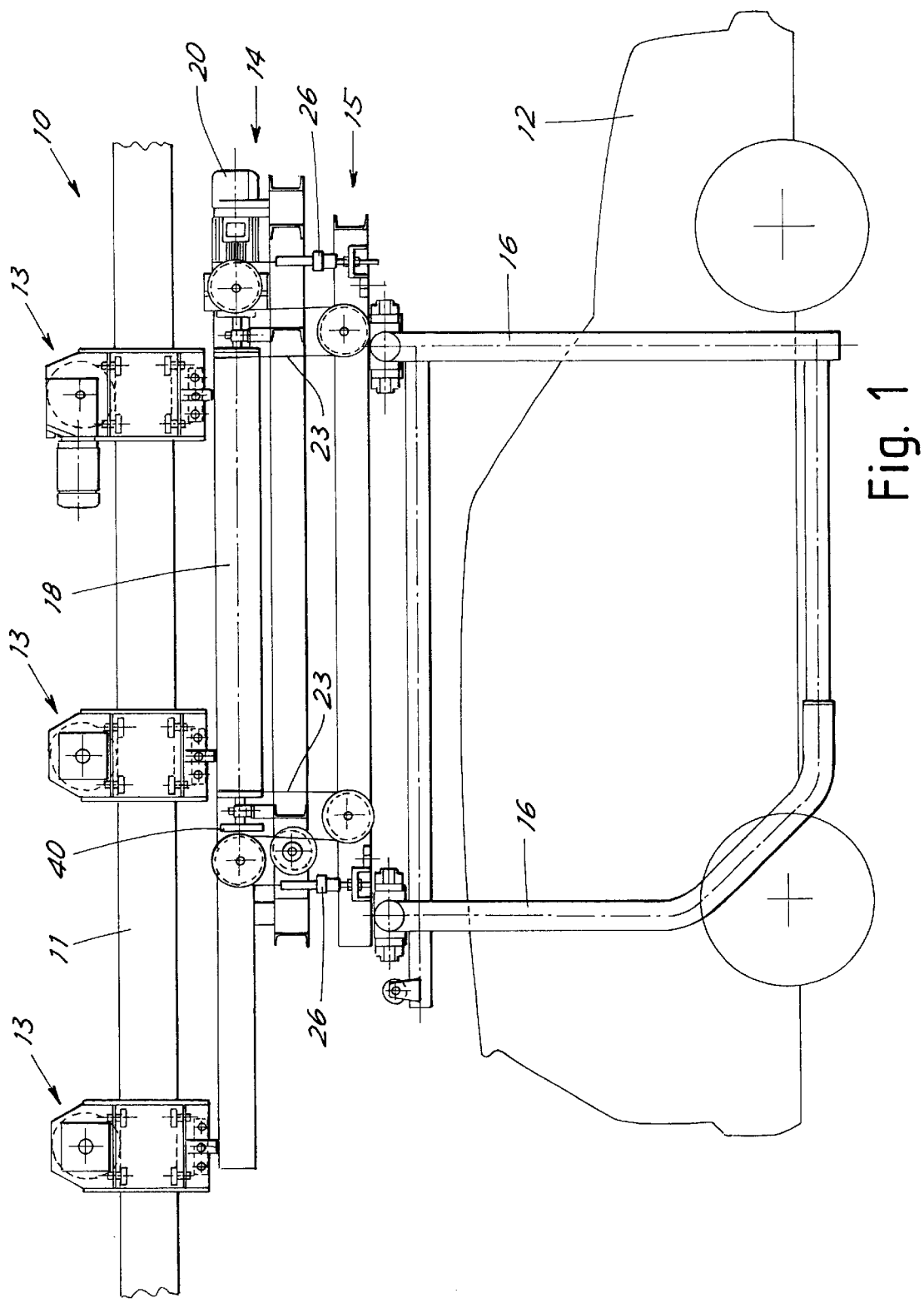
FIG. 1 shows a diagrammatic side elevation view of a transportation hanger provided in accordance with the present invention.

With reference to the figures, FIG. 1 shows a hanger designated as a whole by reference number 10 which runs by means of powered carriages 13 on a rail 11 to transport in a system an object 12, typically an automobile body. The hanger comprises an upper part or fixed frame 14 hanging on the carriages 13 and a lower part or movable platform 15 which bears arms 16 for support of the load and is hung to the upper part to be vertically movable in relation thereto by means of a raising device 17.

Figure 2:
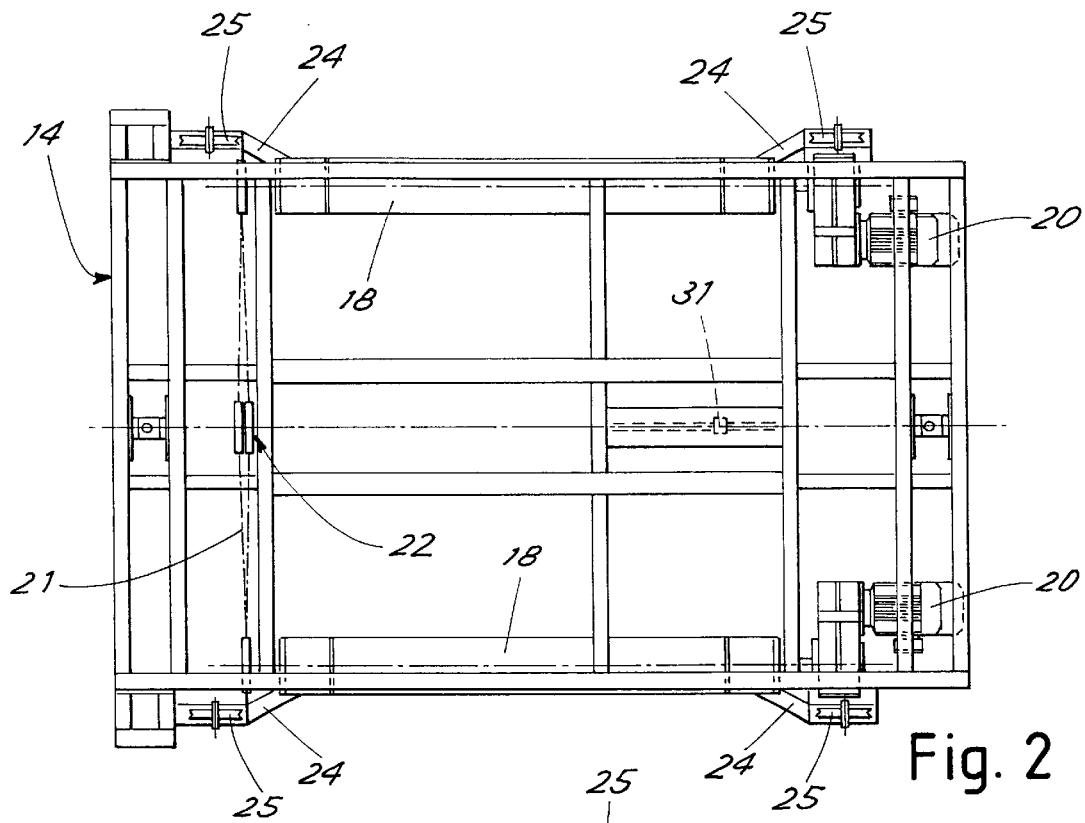
FIG. 2 shows a plan view of the hanger of FIG. 1.
Figure 3:
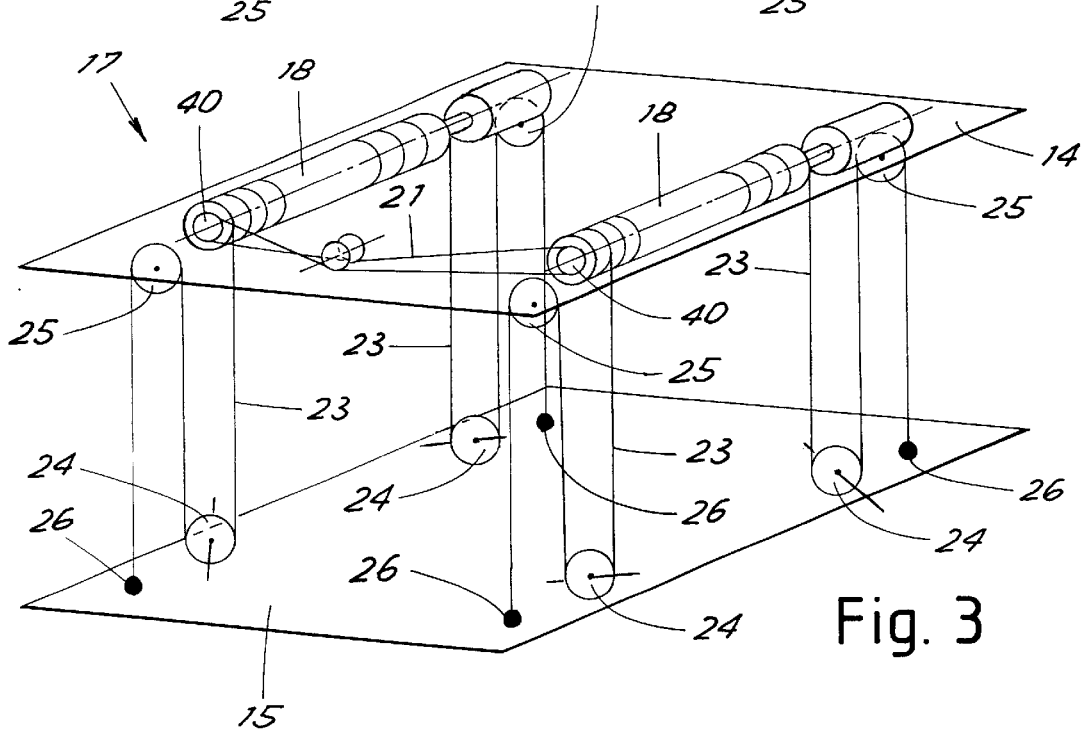
FIG. 3 shows a diagrammatic view of the vertical movement device of the part which is movable in relation to the fixed part.

As may be seen in FIG. 2 and better in FIG. 3 the upper part 14 bears two drums 18 arranged at the sides of the hanger with axes horizontal and longitudinal to the extension of the hanger in relation to the direction of movement of the rail. The two drums are powered separately by respective motors 20.

On opposite ends of the drums are wound cables 23 each of which is returned on a pulley 24 fixed in a rotating manner to the movable platform 15 of the hanger to then return on a pulley 25 fastened in a rotating manner to the upper part of the hanger and lastly fastened at one end 26 to the movable platform. As may be seen in FIG. 2 the pulleys 24 have their horizontal rotation axis inclined in relation to the hanger axis.

Upon rotation of the drums the movable platform is lifted or lowered parallel to itself.

Advantageously the rotation axes of the drums 18 support integrated pinion gears 40 which are interconnected by a chain 21. This ensures synchronization of drum rotation with appropriate motor control. In addition, by sizing each motor in such a manner that it is able to support the entire load alone it is possible to ensure that in case of failure or breakage of one of the vertical movement units of the platform the platform will not fall but can be taken to a safe position.

Advantageously the chain 21 crosses by means of a pair of transmissions 22 arranged in an intermediate position between the drums so that the drums have opposite rotation directions.

Figure 4:
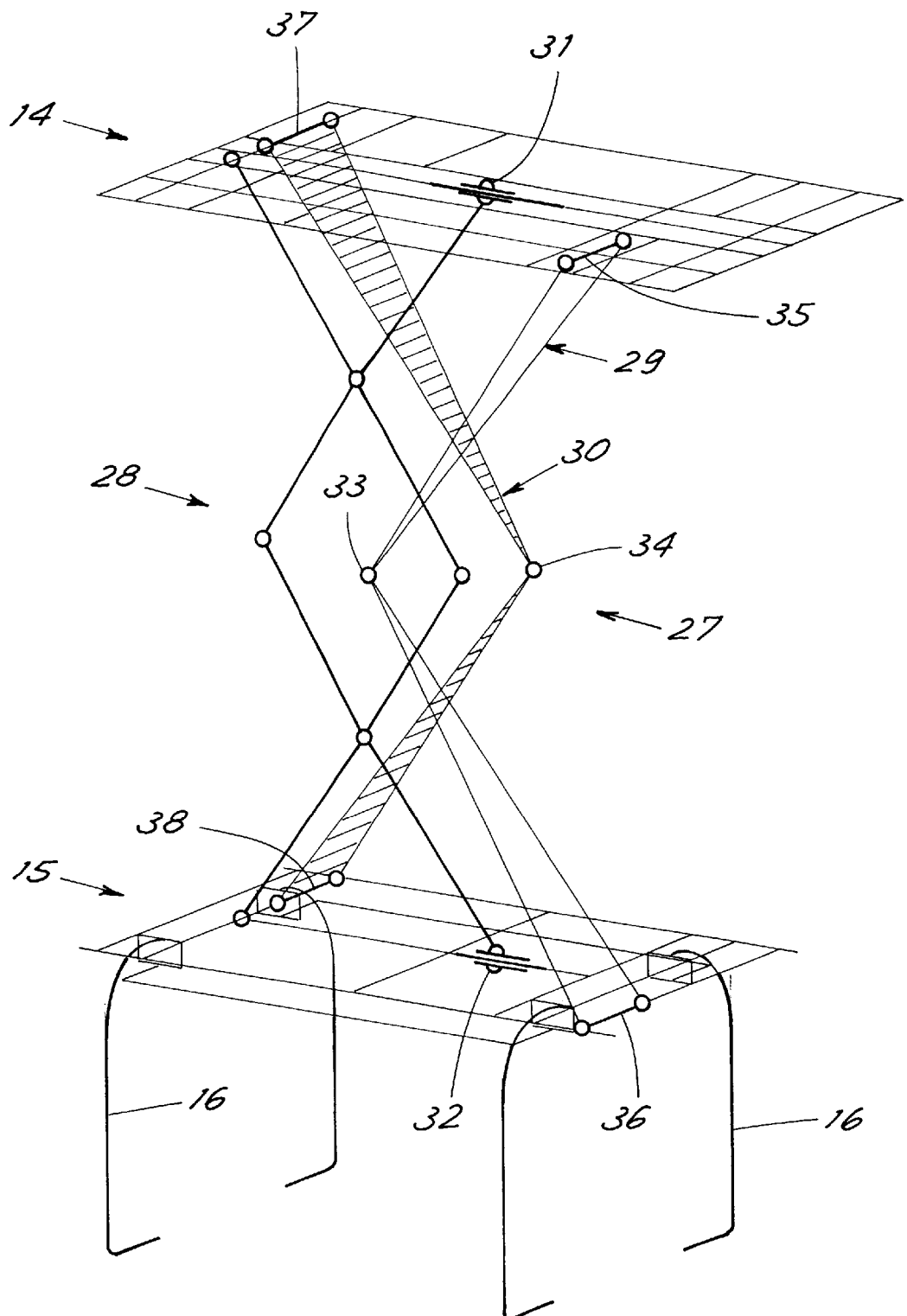
FIG. 4 shows a diagrammatic perspective view of the stiffening structure between the fixed and the vertically movable parts of the hanger.

FIG. 4 shows the stiffening structure designated as a whole by reference number 27 which prevents oscillation and straying of the movable platform in relation to the fixed upper frame.

This stiffening structure comprises three stiffening members one of which is a parallelogram 28 and is arranged on the median plane of the hanger passing through the runway while the other two are made with oscillating rods 29, 30 and are installed each on one side of the central one to oppose transverse actions. The parallelogram has two of the end rods which are constrained to the upper and lower parts of the hanger by means of shoes 31, 32 longitudinal to the hanger.

Axial sliding of the hinges is prevented.

It was also found advantageous for the embodiment of each oscillating rod to use triangular members constrained by an articulation 33, 34 at the acute vertices and hinged to the frame on the minor legs 35–38 arranged transversely to the hanger. Each oscillating rod 29, 30 has hinging 35–38 which is opposite to the corresponding hinging of the other oscillating rod in relation to a transverse plane of the hanger.

The parallelogram makes it possible to use the entire length of the hanger while giving the greatest relative stiffness. The lateral stiffeners offer considerable transverse stiffness in relation to the direction of travel as the central one is not cumbersome.

The use of an articulation instead of a hinge at the joint axis where the two triangles connect removes any alignment difficulty.

It is now clear that the predetermined purposes have been achieved by making available a hanger with lift which has a simple structure but at the same time is extremely stout and rigid against oscillations even with the load table completely lowered.

In addition, thanks to the double synchronized vertical movement system, in case of breakage of a movement unit the other withholds the movable frame without undergoing the propulsive overloads typical of know safety devices such as the so-called parachutes. This prevents fractures and subsequent breakages which could be caused by propulsive loads.

As a further safety measure to prevent the damaging consequences of a possible speed increase due to loss of control by the electronic apparatus which controls the motors, speed increase detection devices connected to the drum axis could be provided. These devices (not shown because basically prior art and readily imaginable to those skilled in the art) stop travel if the increase detected exceeds a predetermined safe amount. These devices could be the electromechanical type with lobed wheels or with an arm with jack operating an electrical stop by inertia et cetera or they could be electronic, for example a known system with encoder.

Naturally the above description of an embodiment applying the innovative principles of the present invention is given by way of non-limiting example of said principles within the scope of the exclusive right claimed here.

For example the unit providing movement along the runway and the structure of the runway could vary depending on the specific requirements just as the load structures could vary depending on the objects to be transported. In addition, the connecting chain between the drums could even be not crossed and/or an inverter or an appropriate geared transmission could be used to secure opposite rotation of the drums.

What is claimed is:

1. Hanger for transportation of objects along a suspended runway, said hanger comprising an upper part constrained to run along the suspended runway and a lower part for supporting the objects and the lower part being connected to the upper part through a raising and lowering system, a stiffening structure arranged between the upper part and the lower part for limiting oscillations, the stiffening structure comprises three stiffening members one of the three stiffening members being centrally located and having only a single parallelogram shape and being arranged on a median plane of the hanger while the other two of the three stiffening members including oscillating rods and each of the other two stiffening members being placed on one side of the central stiffening member, respectively.

2. Hanger in accordance with claim 1, wherein each oscillating rod includes triangular members constrained by an articulation at acute vertices and hinged respectively to the upper part and the lower part on minor legs arranged transversely to the hanger.

3. Hanger in accordance with claim 2, wherein each oscillating rod has hinging which is opposite to corresponding hinging of the other oscillating rod in relation to a transverse plane of the hanger.

4. Hanger in accordance with claim 1, wherein the raising and lowering system comprises on the upper part two drums arranged at sides of the hanger and with a rotation axis arranged horizontal and longitudinal to an extension of the hanger with each drum being separately powered and on each drum being wound two cables for raising one side of the lower part.

5. Hanger in accordance with claim 4, wherein each cable which unrolls from a drum is returned on a pulley fastened in a rotating manner to the lower part of the hanger to then return on a pulley fastened in a rotating manner to the upper part of the hanger and lastly fastened at one end to the lower part of the hanger.

6. Hanger in accordance with claim 4, wherein rotation axes of the drums are interconnected by a kinematic mechanism with a chain for synchronized rotation thereof and coupled operation by a power unit of only one of the drums in case of failure of a power unit of the other drum.

7. Hanger in accordance with claim 6, wherein the chain comprises a chain wound on pinions coaxial and integral with the drums and crossing by a pair of return transmissions arranged in an intermediate position between the drums so as to have synchronized and opposite rotation of the drums.

* * * * *